(12) United States Patent
Kato

(10) Patent No.: US 7,600,052 B2
(45) Date of Patent: Oct. 6, 2009

(54) PERIPHERAL DEVICE CONTROL METHOD, CONTROL PROGRAM, AND APPARATUS THEREFOR

(75) Inventor: Hisashi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 428 days.

(21) Appl. No.: 11/037,353

(22) Filed: Jan. 19, 2005

(65) Prior Publication Data
US 2005/0165979 A1    Jul. 28, 2005

(30) Foreign Application Priority Data
Jan. 22, 2004    (JP) .............................. 2004-014263

(51) Int. Cl.
*G06F 3/00*    (2006.01)
(52) U.S. Cl. ........................................... 710/8; 710/15
(58) Field of Classification Search .................. 710/15, 710/8
See application file for complete search history.

(56) References Cited

U.S. PATENT DOCUMENTS 7,106,465 B1 *    9/2006    Simpson et al. ............ 358/1.15

2003/0200427 A1 *    10/2003    Kemp et al. .................... 713/1
2005/0157321 A1 *    7/2005    Alacar ........................ 358/1.13
2005/0185211 A1 *    8/2005    Foehr et al. ................ 358/1.15

* cited by examiner

*Primary Examiner*—Henry W. H. Tsai
*Assistant Examiner*—John B Roche
(74) *Attorney, Agent, or Firm*—Fitzpatrick, Cella, Harper & Scinto

(57) ABSTRACT

This invention allows an application to set/modify an extension function without opening the user interface of a device driver in an environment in which the function extension of the device driver is implemented in a plugin form. To cause the application to execute printing processing using a printer driver as one of the device drivers and a function extension module having a parameter which cannot be set by the printer driver, the application reserves a memory area having a capacity including a parameter managed by the printer driver and a parameter managed by the function extension module. The application transfers at least the position of the memory area, an identifier for specifying a parameter, and the setting value of the parameter to the printer driver or function extension module to set the setting value in the parameter specified by the identifier of the memory area. The printer driver and function extension module perform printing processing using the parameter of the memory area.

16 Claims, 9 Drawing Sheets

FIG. 8

```
SETTING MODIFICATION PROCESSING FUNCTION

LONG DocumentPropertiesEx(
        HWND hWnd,                    // handle to parent window
        HANDLE hPrinter,              // handle to printer object
        LPTSTR pDeviceName,           // device name
        PDEVMODE pDevMdeInOutput,     // original device mode &
                                      // modified device mode
        DWORD dwItemID,               // indicate ItemID
        LPVOID pItemParam             // Parameter indicated by ItemID
};
```

PERIPHERAL DEVICE CONTROL METHOD, CONTROL PROGRAM, AND APPARATUS THEREFOR

FIELD OF THE INVENTION

The present invention relates to a peripheral device control method, control program, and apparatus therefor which provide an extension function to a device driver.

BACKGROUND OF THE INVENTION

To make an application program (to be referred to as an application hereinafter) running on a computer control a peripheral device, as a general method, various settings required for control are transferred, as parameters, together with a control start instruction to a peripheral device control processing program such as a device driver. As described above, the application transfers the various settings required for controlling the peripheral device to the device driver as parameters. This makes it possible to obtain peripheral device operation intended by the application. For example, when an application running on a computer executes printing, various settings required for printing are transferred, as parameters, together with a printing start instruction to a printing processing program such as a printer driver. This makes it possible to obtain a printout intended by the application.

In the following description of background arts and problems, to grasp the technical contents and problems more clearly, printing processing from an application, which is an application of the present invention, will be described in detail. These problems are common to control of a peripheral device using an application, and are not particularly limited to the printing processing.

In the printing processing from the application, the range of types of setting values which can be designated to obtain a printout intended by the application is limited to designation of a sheet feed port which can be supported by any printer, designation of two-sided printing and one-sided printing, and the like. Other useful functions which cannot be directly designated by the application although they are provided by a printer or printer driver must be designated by opening the user interface of the printer driver. For this reason, when display of the user interface of the printer driver is not desired in printing output from various enterprise system software programs, the functions of the printer or printer driver cannot be sufficiently enhanced.

To fully enhance printers or printer drivers available these days, a new printer driver supports a special interface which can be used from an application to perform model-dependent settings to the printers and printer drivers. This printer driver allows settings equivalent to settings at the user interface of the printer driver.

When this interface is used in an environment where the function extension of a plugin printer driver is implemented, the following problems are posed. The function extension of the plugin printer driver is a method of adding a function by providing a difference module, i.e., a plugin. When a function is extended in a plugin form, setting items corresponding to the extended function are present and unknown to the printer driver. When the setting items of the function extended in the plugin form from the application are to be modified using the special interface, the printer driver recognizes a setting/modification request to the setting items as a request to an unknown setting item. The printer driver notifies the application of "no support".

The printer driver must consider the function of a plugin in order to set/modify the plugin from the application. That is, the device driver for peripheral device control must consider the function of a plugin in order to set/modify the function of the plugin for peripheral device control from the application.

SUMMARY OF THE INVENTION

The present invention has been made in consideration of the conventional problems described above, and has as its object to implement setting/modification of an extension function from an application without opening the user interface of the device driver in an environment where the function extension of the device driver is implemented in a plugin form.

In order to achieve the above object, the present invention is constituted by the following arrangement.

That is, there is provided a peripheral device control method of allowing an application to execute peripheral device control processing using a device driver which generates a peripheral device control command and a function extension module having a parameter which cannot be set by the device driver, comprising: a step of manipulating by the application, using a predetermined interface, a parameter managed by the device driver and a parameter managed by the function extension module; a step of, in response to the manipulation step, setting a parameter by the device driver or function extension module; and a step of executing the peripheral device control processing using the parameter by the device driver and function extension module.

In this case, the predetermined interface comprises an interface published by the device driver or an operating system. The method further comprises a step of reserving by the application, a memory area having a capacity for a parameter managed by the device driver and a parameter managed by the function extension module, wherein the manipulation step manipulates the parameter managed by the function extension module by executing a transfer step of transferring at least a position of the memory area, an identifier for specifying a parameter, and a setting value of the parameter from the application to the device driver or function extension module, and a setting step of setting by the device driver or function extension module, the setting value in the parameter specified by the identifier of the memory area. In the transfer step, at least the position of the memory area, the identifier for specifying the parameter, and the setting value of the parameter as arguments of the predetermined interface are transferred from the application to the device driver or function extension module. In the setting step, whether the identifier is an identifier of the parameter managed by the device driver is determined, and when it is determined that the identifier is not the identifier of the parameter managed by the device driver, the setting value is set in the parameter managed by the function extension module. The method further comprises a step of sending a notification representing that setting cannot be performed to the application when an identifier is neither the identifier of the parameter managed by the device driver nor an identifier of the parameter managed by the function extension module. The method further comprises a step of releasing the reserved memory area when the peripheral device control processing is ended.

There is also provided an application program including peripheral device control processing using a device driver for generating a peripheral device control command and a function extension module having a parameter which cannot be set by the device driver, comprising: a step of inquiring of the device driver and function extension module a capacity including a parameter managed by the device driver and a parameter managed by the function extension module and reserving a memory area having the capacity; a step of transferring a position of the memory area, an identifier for specifying a parameter, and a setting value of the parameter to the device driver or function extension module; and a step of instructing the device driver and function extension module to execute the peripheral device control processing using a parameter of the memory area in which the setting value is set in the parameter specified by the identifier. In this case, the method further comprises a step of releasing the reserved memory area when the peripheral device control processing is ended.

There is further provided a device driver program for generating a peripheral device control command in response to peripheral device control processing of an application, comprising a step of, in response to an inquiry from the application, returning a capacity including a parameter managed by the device driver program and a parameter which cannot be set from the device driver program managed by a function extension module of the device driver program, a step of receiving from the application at least a position of a memory area having the capacity reserved by the application, an identifier for specifying a parameter, and a setting value of the parameter, a step of determining whether the identifier is an identifier of the parameter managed by the device driver program, a step of, when the identifier is determined to be the identifier of the parameter managed by the device drive program, setting the setting value in the parameter specified by the identifier, and when the identifier is determined not to be the identifier managed by the device driver program, transferring to the function extension program the position of the memory area having the capacity reserved by the application, the identifier for specifying the parameter, and the setting value of the parameter, and a step of performing the peripheral device control processing using the parameter of the memory area in which the setting value is set.

There is further provided a function extension module program for function extension of a device driver for generating a peripheral device control command in response to the peripheral device control processing of an application, comprising a step of, in response to an inquiry from the device driver, returning a capacity of a parameter which cannot be set by the device driver managed by the function extension module program, a step of receiving from the device driver at least a position of the memory area having the capacity reserved by the application, an identifier for specifying a parameter, and a setting value of the parameter, a step of determining whether the identifier is an identifier of the parameter managed by the function extension module program, a step of, when the identifier is determined to be the identifier of the parameter managed by the function extension module program, setting the setting value in the parameter specified by the identifier, and when the identifier is determined not to be the identifier of the parameter managed by the function extension module program, sending a notification representing that setting cannot be performed to the application, and a step of performing peripheral device control function extension processing using the parameter of the memory area in which the setting value is set.

A storage medium which computer-readably stores each program described above is also provided.

There is further provided a peripheral device control apparatus for allowing an application to execute peripheral device control processing using a device driver which generates a peripheral device control command and a function extension module having a parameter which cannot be set by the device driver, comprising: manipulation means for manipulating by the application, using a predetermined interface, a parameter managed by the device driver and a parameter managed by the function extension module; setting means for, in response to manipulation of the manipulation means, setting a parameter by the device driver or function extension module; and executing means for executing the peripheral device control processing using the parameter by the device driver and function extension module.

In this case, the predetermined interface comprises an interface published by the device driver or an operating system. The apparatus further comprises reserving means for reserving by the application, a memory area having a capacity for a parameter managed by the device driver and a parameter managed by the function extension module, wherein the manipulation means comprises transfer means for transferring at least a position of the memory area, an identifier for specifying a parameter, and a setting value of the parameter from the application to the device driver or function extension module, and setting means for setting by the device driver or function extension module, the setting value in the parameter specified by the identifier of the memory area, and the manipulation means manipulates the parameter managed by the function extension module. The transfer means transfers from the application to the device driver or function extension module at least the position of the memory area, the identifier for specifying the parameter, and the setting value of the parameter as arguments of the predetermined interface. The setting means determines whether the identifier is an identifier of the parameter managed by the device driver, and when the setting means determines that the identifier is not the identifier of the parameter managed by the device driver, sets the setting value in the parameter managed by the function extension module. The apparatus further comprises means for sending a notification representing that setting cannot be performed to the application when an identifier is neither the identifier of the parameter managed by the device driver nor an identifier of the parameter managed by the function extension module. The apparatus further comprises means for releasing the reserved memory area when the peripheral device control processing is ended.

As described above, according to the present invention, even if a new function is added to a device driver in a plugin form, an application can modify the setting value into that of a new function without opening the user interface of the device driver.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a view showing a setting modification function according to the present invention.

DETAILED DESCRIPTION OF THE PREFERRED EMBODIMENT

A preferred embodiment to which the present invention is suitably applicable will now be described below. This embodiment will exemplify a case in which printing processing is performed from an application via a printer driver. This technique is commonly applicable to control processing of a peripheral device from an application via the device driver of peripheral device control, and is also incorporated in the present invention. The printer, printer driver, and graphic driver in the embodiment can be read as the peripheral device, device driver, and the function implementing driver of another peripheral device, respectively. For example, when the peripheral device is a display, the device driver is a display driver. When the peripheral device is a scanner, the device driver is a scanner driver. For example, a plugin module can cope with an extension function such as two-sided scanning and area segmentation.

Arrangement of Printing Processing System of this Embodiment

Figure 1:
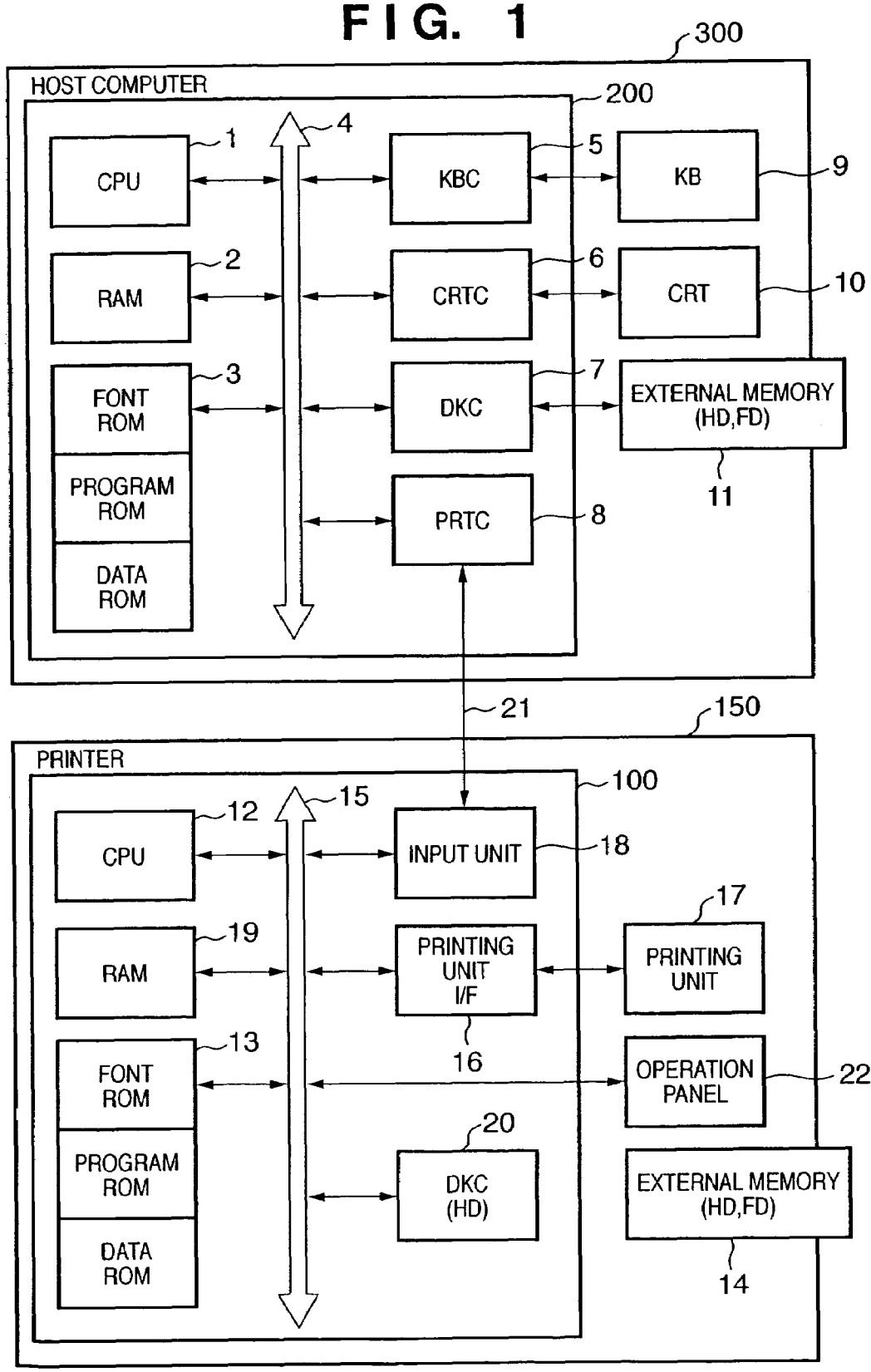
FIG. 1 is a block diagram for explaining an arrangement of a printing processing system according to an embodiment.

FIG. 1 is a block diagram for explaining the arrangement of a printing processing system of this embodiment. The present invention is applicable to a single device, a system made of a plurality of devices, or a system connected via a network such as a LAN or WAN to execute processing if the function of the present invention is executed, unless otherwise specified.

(Arrangement of Host Computer)

Referring to FIG. 1, a host computer 300 includes a computer controller main body 200.

The host computer 300 comprises a CPU 1. On the basis of a document processing program stored in the program ROM of a ROM 3 or an external memory 11, the CPU 1 executes processing of a document in which graphic, image, character, and table (including spreadsheet) data are mixed. The CPU 1 systematically controls the respective devices connected to a system bus 4. An operating system program (to be referred to as an OS hereinafter) and the like as the control program for the CPU 1 are stored in the program ROM of the ROM 3 or the external memory 11. Font data and the like used for the above document processing are stored in the font ROM of the ROM 3 or the external memory 11. Various data used for the above document processing or the like are stored in the data ROM of the ROM 3 or the external memory 11. A RAM 2 functions as a main memory, work area, and the like.

A keyboard controller (KBC) 5 controls key inputs from a keyboard 9 or a pointing device (not shown). A CRT controller (CRTC) 6 controls the display on a CRT display (CRT) 10. A disk controller (DKC) 7 controls access to the external memory 11 such as a hard disk (HD) or floppy (trademark) disk (FD) which stores a boot program, various applications, font data, user files, editing files, and a printer control command generation program (printer driver) as a kind of a device driver. A printer controller (PRTC) 8 is connected to a printer 150 as a peripheral device including various image forming apparatuses such as a digital camera, printer, facsimile apparatus, and multifunction apparatus thereof. The printer controller executes communication control processing with the printer 150.

Note that the CPU 1, for example, rasterizes outline fonts in a display information RAM set on the RAM 2 and allows WYSIWYG on the CRT 10. The CPU 1 opens various types of windows registered on the basis of commands designated by a mouse cursor (not shown) or the like on the CRT 10. When the user wants to print, he opens a window pertaining to printing setting and can set a printing processing method for a printer driver, including printer setting and printing mode selection.

(Arrangement of Printer)

Referring to FIG. 1, the printer 150 includes a printer controller main body 100.

The printer 150 includes a printer CPU 12. The printer CPU 12 outputs an image signal as output information to a printing unit (printer engine) 17 connected to a system bus 15 through printing unit interface 16, on the basis of control programs stored in an external memory 14 or the program ROM of a ROM 13. The program ROM of the ROM 13 also stores control programs of the CPU 12. The font ROM of the ROM 13 stores font data and the like used for generating the output information. The data ROM of the ROM 13 stores information and the like used on the host computer when a printer does not have the external memory 14 such as a hard disk.

The CPU 12 can communicate with the host computer 300 via an input unit 18 and can transmit information and the like in the printer 150 to the host computer 300. A RAM 19 functions as a main memory or work area. The RAM 19 can be expanded using an optional RAM connected to an expansion port (not shown). The RAM 19 is used as an output information rasterization area, environment data storage area, NVRAM, and the like. The access of the external memory 14 such as the above-mentioned hard disk (HD) and an IC card is controlled by a memory controller (MC) 20. The external memory 14 is connected as an optional memory and stores font data, emulation programs, form data, and the like. An operation panel 22 has switches, an LED display, and the like. The number of above-mentioned external memories is not limited to one, but can be two or more. A plurality of external memories such as an optional font card in addition to the standard fonts and external memories which store programs for interpreting different printer control languages may be connected. In addition, an NVRAM (not shown) may be provided to store printer mode setting information from the operation panel 22.

(Printer Driver Extension System of this Embodiment)

Figure 3:
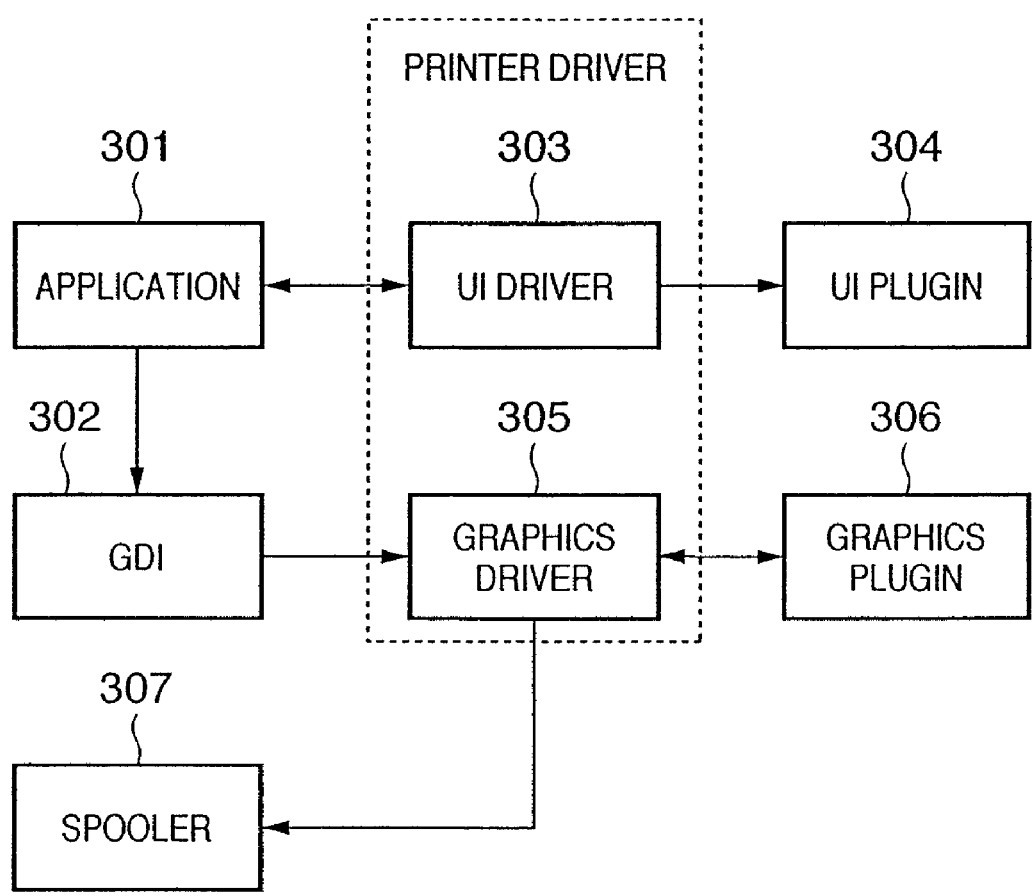
FIG. 3 is a block diagram showing a printer driver extension system according to this embodiment.

A printer driver extension system of this embodiment is arranged such that a plugin module is added to the printer driver. As shown in FIG. 3, the plugin module comprises a UI plugin 304 having an extension function of a driver 303 and a graphics plugin 306 having an extension function of a graphics driver 305. These plugin modules will be described with reference to FIG. 3.

The UI plugin 304 is used to add a new sheet to the driver UI and customize various event processes set in the UI driver 303 in installation. The UI driver 303 acquires an interface published by the UI plugin when a DDI (Device Driver Interface) exported to the system is called. The UI driver 303 communicates with the UI plugin 304 using the interface of the UI plugin 304 which has been acquired by the UI driver 303, thereby executing customization processing set in the UI driver 303.

The graphics plugin 306 is used to override processing of the DDI serving as an interface between the GDI (Graphics Device Interface 302) and the graphics driver 305. The graphics plugin 306 is also used to add processing at a specific timing and override spool processing of printing data. The DDI exported by the graphics driver 305 is called from the GDI for generating a job, as needed. At its initialization timing, the graphics driver 305 acquires an interface published by the graphics plugin 306 and holds it in the RAM 2. Processing of the graphics plugin 306 corresponding to a called DDI is called at a timing when the DDI is called. The called graphics plugin 306 executes processing set in the plugin and returns the processing to the graphics driver 305 again. When the graphics plugin has overridden the processing, the DDI immediately ends the processing. When additional processing is set, subsequent processing continues. When the graphics plugin 306 overrides spool processing of printing data of the graphics driver 305, the interface of the graphics plugin 306 is called immediately before the printing data in the graphics driver 305 is spooled. The called graphics plugin acquires the data to be spooled and executes specific processing. The called graphics plugin then calls a spool processing function of the graphics driver 305 again and transfers data having undergone the specific processing to the graphics driver 305. Upon reception of the data, the graphics driver 305 executes processing for actually spooling the data to a system spooler 307.

When the extension function is imparted to the plugin module as described above, the printer driver extension system can be implemented.

(Memory Map in Printing Processing of this Embodiment)

Figure 2:
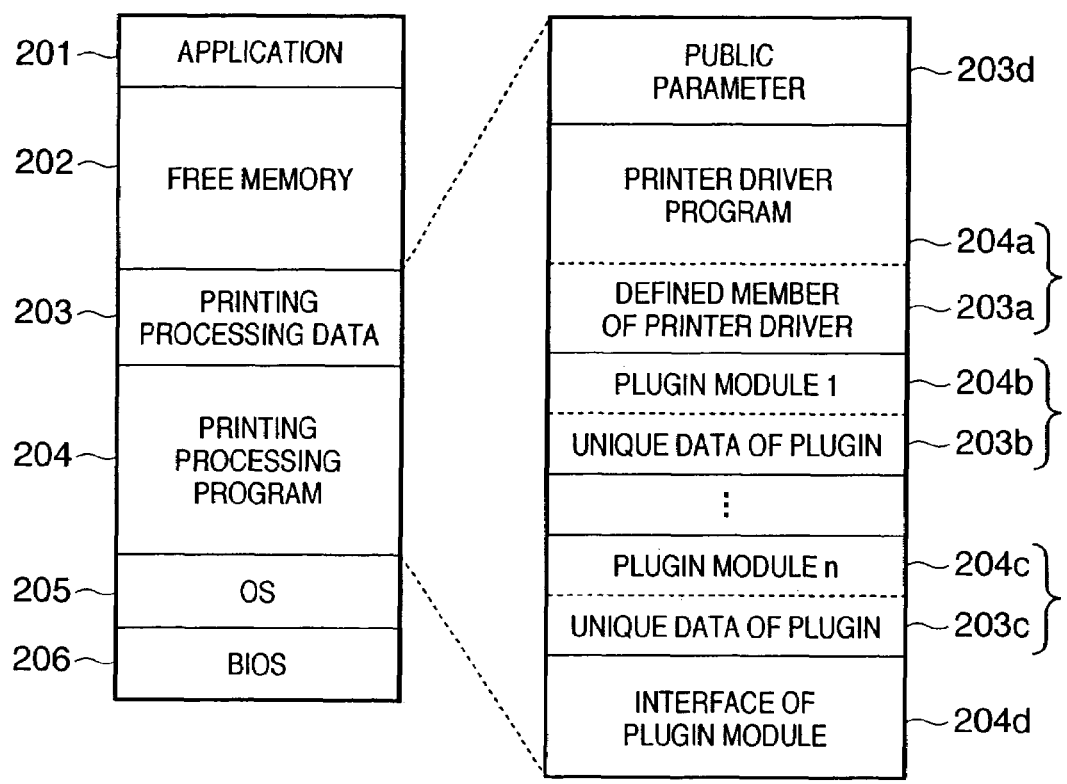
FIG. 2 is a view showing a memory map of a printing processing program loaded on a RAM 2 of a host computer 300 and set in an executable state according to this embodiment.

FIG. 2 is a memory map in printing processing of this embodiment. This memory map represents a state in which an application executes setting processing in this embodiment.

On the left side of FIG. 2, reference numeral 201 denotes an area of an application including printing processing; 202, a free memory area; 203, an area of printing processing data used in printing processing; 204, an area of a printing processing program including a printer driver and plugin module; 205, an OS area; and 206, a BIOS area. Note that although each area is illustrated as a single area in FIG. 2, the areas are distributed at arbitrary addresses by normal area reserve/release control of the RAM 2 except resident programs such as the OS and BIOS.

The right side of FIG. 2 shows the structure of the printing processing data 203 and the printing processing program 204. A printer driver program 204*a*, its related data 203*a*, plugin module programs 204*b* and 204*c*, and their related data 203*b* and 203*c*, a plugin module interface 204*d*, and a public parameter 203*d* are prepared before setting processing to be executed by the application of this embodiment.

Operation Sequence of Printing Processing System of this Embodiment

The operation sequence of the printing processing system having the above arrangement according to this embodiment will be described below.

Figure 5:
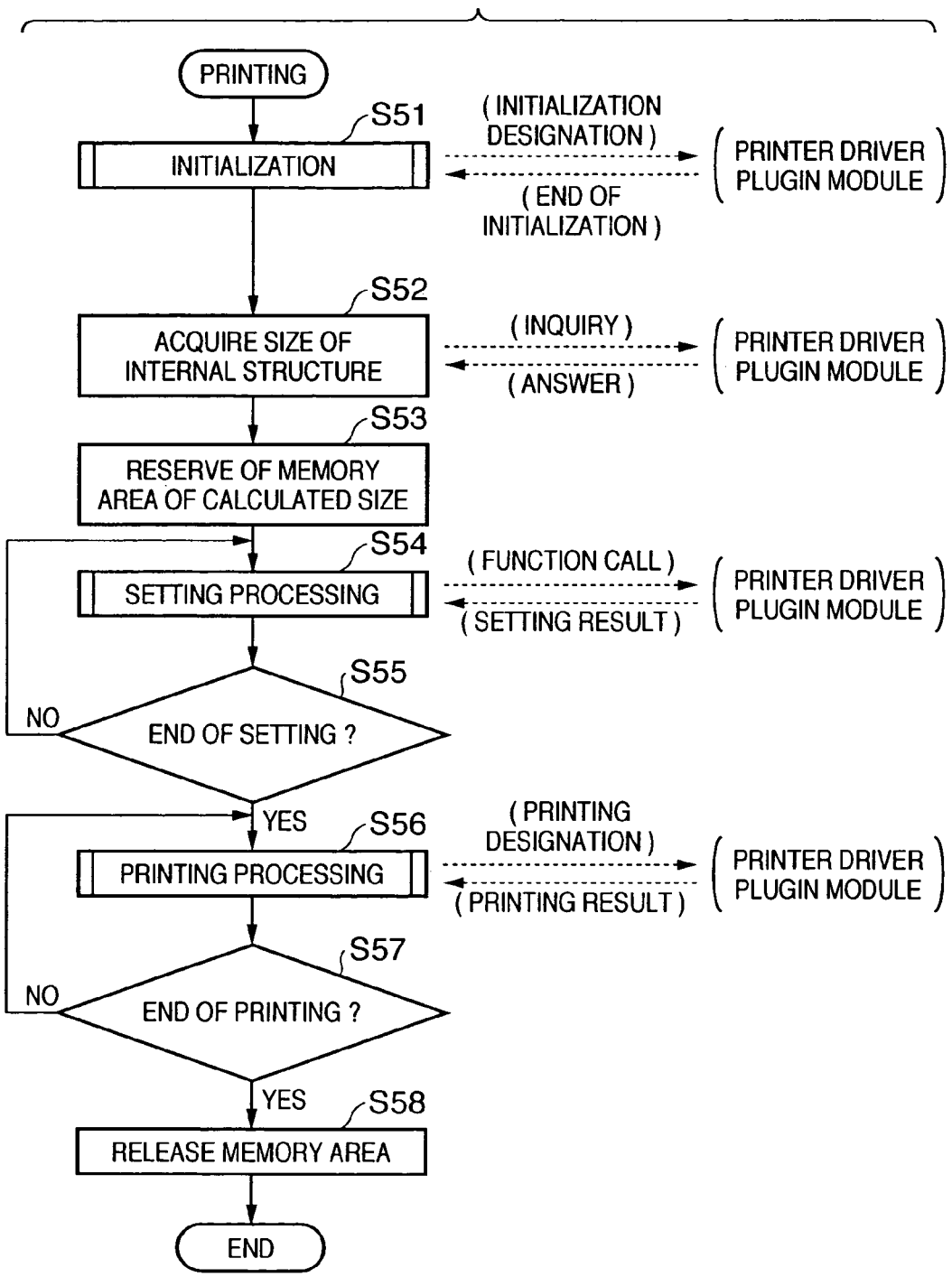
FIG. 5 is a flowchart showing a sequence of application's printing processing according to this embodiment.

FIG. 5 is a flowchart showing a printing processing sequence of the application.

(Initialization of Printing Processing: Step S51)

When the application designates printing processing, initialization of printing processing is requested in step S51. This request is executed by the printer driver under the control of the OS 205.

In printing processing by the printing processing program (including the printer driver) 204 shown in this embodiment, when initialization processing having the printer driver is called by the application 201 running under the control of the OS 205, the printing processing program 204 is loaded in the RAM 2 under the control of the OS 205. When the printing processing program 204 is loaded in the RAM 2, the initialization processing portion of the printer driver installed in the management portion of the printer driver is called to execute initialization processing.

Figure 4:
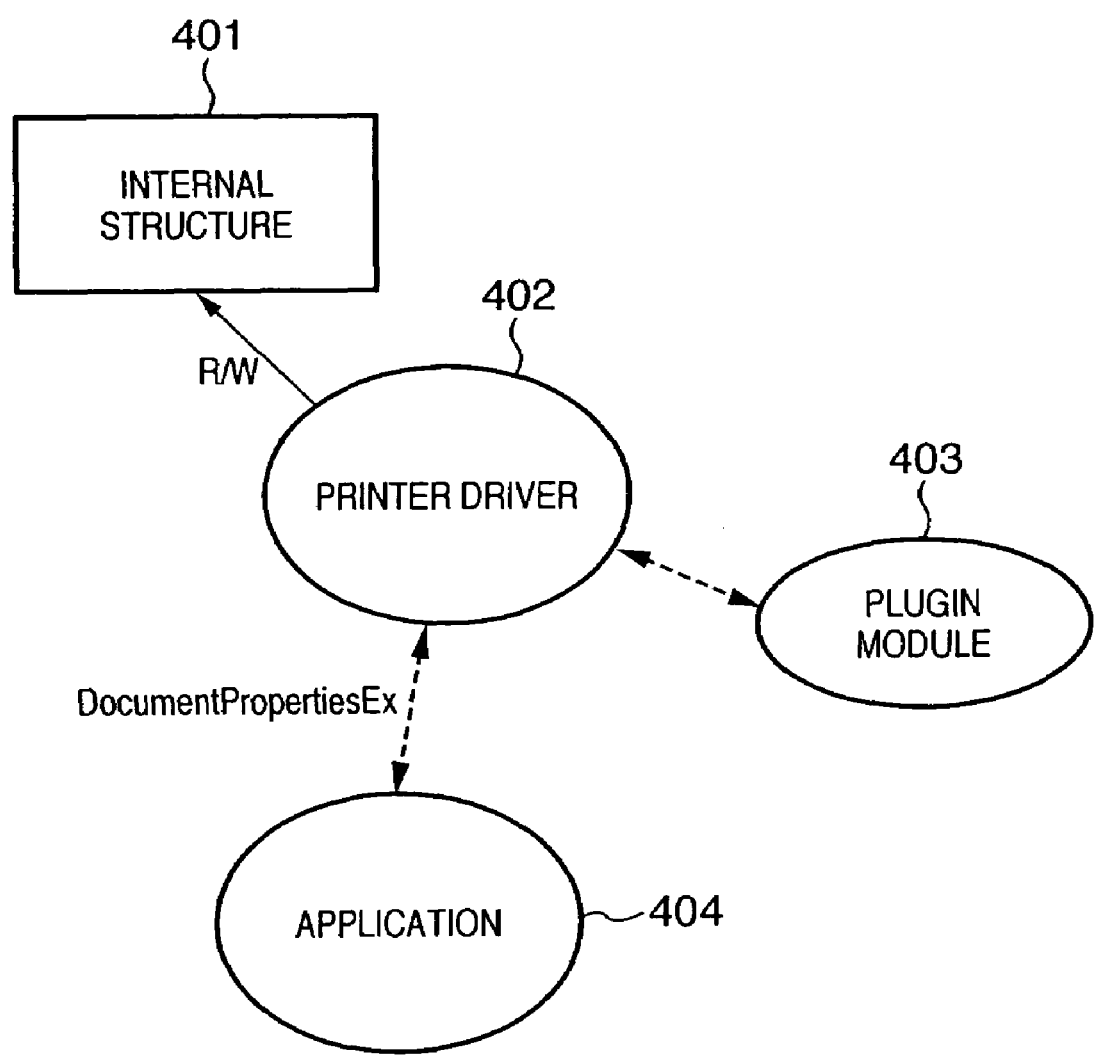
FIG. 4 is a view showing the relationship between modules of the printing processing system according to this embodiment.

FIG. 4 is a view showing the arrangement between the modules when a plugin module 403 as an additional function is installed in the printer driver 204.

Reference numeral 402 denotes a printer driver. An internal structure 401 stores members serving as variables corresponding to the items settable in the printer driver 402. The plugin module 403 is a module in which a function added to the printer driver 402 is set. When the plugin module 403 is installed, as shown in FIG. 4, the printer driver 402 loads in the RAM 2 the plugin module 403 stored in the external memory 11 during initialization processing. The printer driver 402 then acquires the interface of the plugin module 403. The printer driver 402 can communicate with the plugin module 403 using the acquired interface.

The memory map shown in FIG. 2 shows this state.

(Parameter Setting Processing: Steps S52-S55)

The application sets/modifies desired parameters related to printing processing in steps S52 to S55. In this case, an internal structure unique to the application is created in the free memory area 202 and sets/modifies the desired parameters on this unique internal structure. The printer driver and plugin module implement printing processing unique to the application using the parameters of the internal structure unique to the application.

Figure 7:
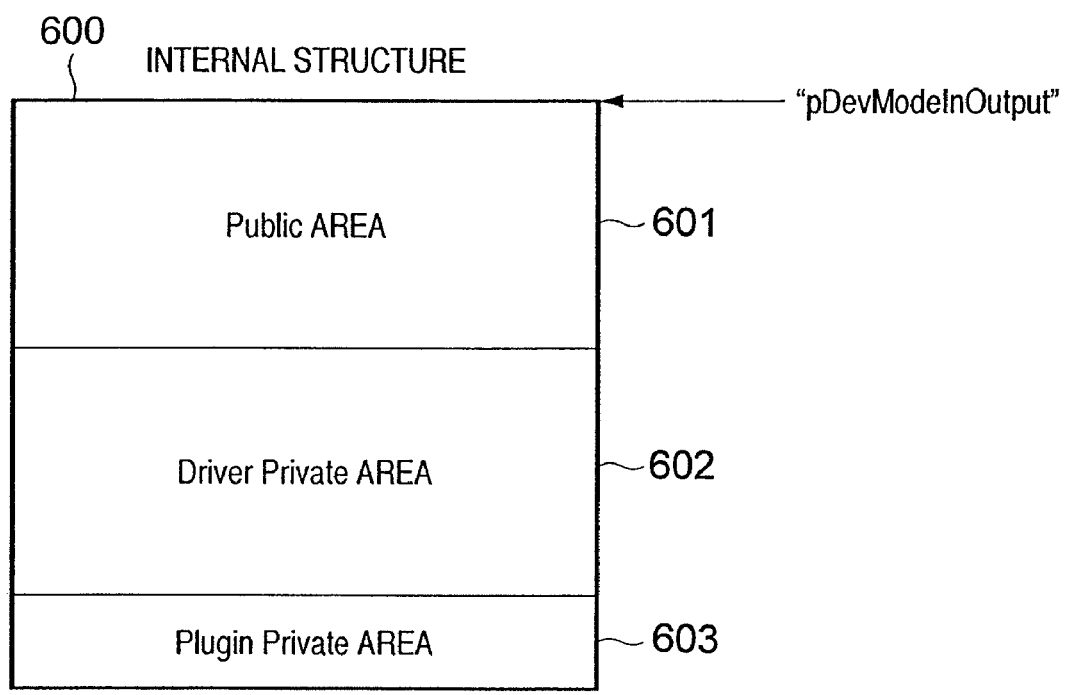
FIG. 7 is a view showing an arrangement of an internal structure according to the present invention.

In step S52, parameter quantities of the printer driver and plugin module are obtained to acquire the size of the internal structure. In step S53, an area for the acquired size is reserved in the free memory area 202. The structure of the ensured internal structure is shown in FIG. 7 and will be described below in detail. In steps S54 and S55, the respective parameter names or IDs, setting information, and addresses of the internal structure are transferred from the application to the printer driver or plugin module as arguments of the setting modification processing function of the printer driver. The parameters are repeatedly set and modified until the completion of setting.

(Detailed Sequence of Parameter Setting Processing)

Figure 6:
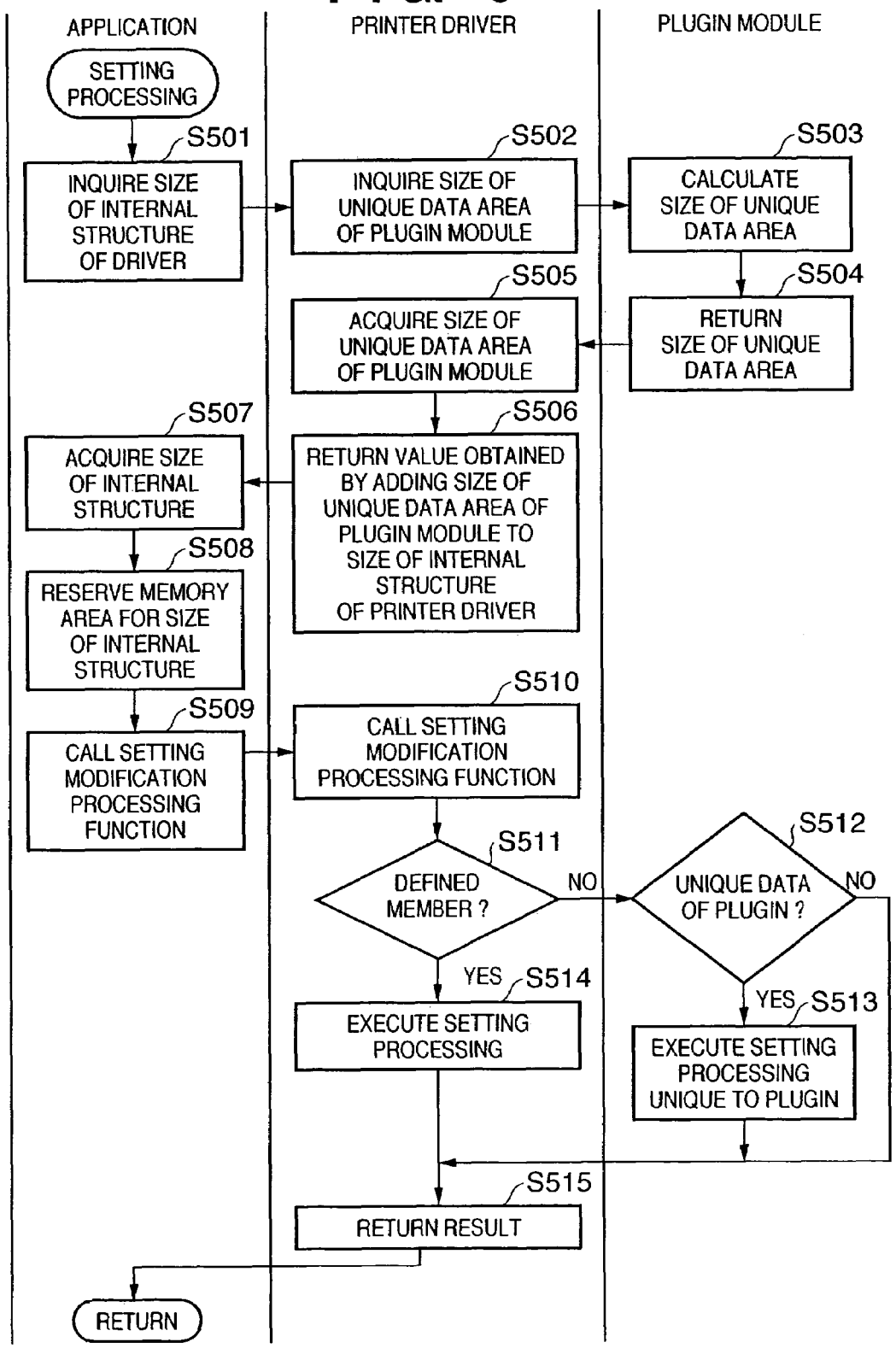
FIG. 6 is a flowchart showing setting modification processing from a setting modification processing function according to this embodiment.

FIG. 6 is a flowchart of causing the application 404 in FIG. 4 to set/modify the setting values of the printer driver 402, i.e., the internal structure 401 in FIG. 4 by using the setting modification processing function (FIG. 8) exported from the printer driver 402. Note that the repetition in steps S54 and S55 of FIG. 5 is omitted to prevent complexity in FIG. 6.

The application 404 inquires of the printer driver 402 a memory area size for storing the internal structure 401 of the printer driver (step S501). The printer driver 402 inquires of the plugin module 403 the necessary data area size of the internal structure via the interface of the plugin module (step S502). The plugin module 403 calculates the necessary area size of the internal structure 401 (S503) and returns the calculated area size to the printer driver 402 (step S504). Upon acquiring the necessary size of the internal structure 401 of the plugin module 403 (step S505), the printer driver 402 returns to the application 404 the data size obtained by adding the size of the plugin module 403 obtained in step S505 to the necessary size of the internal structure 401 for the printer driver 402 (step S506).

The application 404 receives the return value from the printer driver 402 (step S507) and reserves the memory area of the acquired size on the free memory area 202 (step S508).

The internal structure at this time is shown in FIG. 7.

An area 601 in FIG. 7 is a Public area which can also be directly accessed by the application 404; 602, a Driver Private area which can be accessed by the printer driver 402; and 603, a Plugin Private area which can be accessed by the plugin module 403. Since the printer driver 402 does not have internal structure information of the Plugin Private area 603, the printer driver 402 cannot directly access or modify the contents of the Plugin Private area 603. The Public area 601 in FIG. 7 corresponds to the public parameter 203*d* in FIG. 2. The Driver Private area 602 in FIG. 7 corresponds to the defined member 203*a* of the printer driver in FIG. 2. The Plugin Private area 603 in FIG. 7 corresponds to the unique data 203*b* and 203*c* of the plugin in FIG. 2. The internal structure in FIG. 7 is reserved in the free memory area 202 by the corresponding application. Printing processing of each application is executed on the basis of the internal structure reserved in the free memory area 202.

The addresses of the memory area reserved in step S508, the parameter IDs to be set, and the setting contents are transferred to the setting modification processing function exemplified in FIG. 8, thereby executing setting/modification processing (step S509).

Of all the arguments used in the setting modification processing function in FIG. 8, parameters related to the setting modification processing are pDevModeInOutput pItemParam, and dwItemID. The following pieces of information are set in these parameters, respectively:

dWItemID: designates a specific member of the printer driver internal structure which is subjected to modification (parameter ID);

pItemParam: designates the parameter of the member represented by dwItemID (setting contents); and pDevModeInOutput: designates the pointer to the printer driver internal structure (start address of the internal structure or start address of the Driver Private area 602).

Assume that a setting modification request from the application is to modify Print Style from 1-Sided Printing to Booklet Printing. In this case, the following data are set in the above parameters as follows:

dwItemID=DM_ITEM_LAYOUT
pItemParam=DM_PARAM_BOOKLET
pDevModeInOutput=pDevMode and then DocumentPropertiesEx( ) is called.

When the setting modification processing function exported in the printer driver 402 is called (step S510), the printer driver 402 evaluates the value of "deItemID" representing a specific member of the internal structure which is transferred by the setting modification processing function and is to be modified. The printer driver 402 determines whether the value is an ID defined by the printer driver 402 (step S511). It is determined that "dwItemID" is defined in the printer driver 402, the printer driver specifies the address of the parameter from the pointer to the internal structure which is transferred from the application and executes setting modification processing (step S514). The printer driver notifies the application 404 of the processing result (step S515). When the start address of the internal structure 600 is given, the parameter address, i.e., the start address of the Driver Private area 602 is calculated by adding the capacity of the Public area 601.

When it is determined in step S511 that the "dwItemID" value is not defined in the printer driver 402, the interface exported from the plugin module 403 is called. In this case, the parameters transferred from the setting modification processing function are transferred. For example, at this time, when the capacity of the Driver Private area 602 for holding the member defined in the printer driver 402 is transferred, the plugin module 403 can determine the start address of the Plugin Private area 603.

The "dwItemID" value is evaluated in the called plugin module 403 to determine whether the value represents an ID defined in the plugin module 403 (step S512). When it is determined that the ID value is unique data defined in the plugin module 403, the address of the unique data is specified to execute modification processing. The processing result is then returned to the printer driver 402 (step S513). The modification to the unique data of the plugin module 403 is applied to the data in the Plugin Private area 603 in FIG. 6.

When it is determined in step S512 that the value is not defined in the plugin module 403, the plugin module 403 sends a notification representing "no support" to the printer driver 402.

A series of processing operations in steps S509 to S515 are repeatedly executed until the end processing set in the management portion of the printer driver is called by the application.

The above processing makes it possible to allow the application to modify the setting values of the plugin module without opening the printer driver UI.

(Print Processing: S56 and S57)

When parameter setting/modification processing of the application is complete, print processing is started in steps S56 and S57. In this print processing, the parameters respectively used by the printer driver and plugin module are included in the internal structure unique to the application, which has been reserved in the free memory area 202.

(End Processing: S58)

Figure 9:
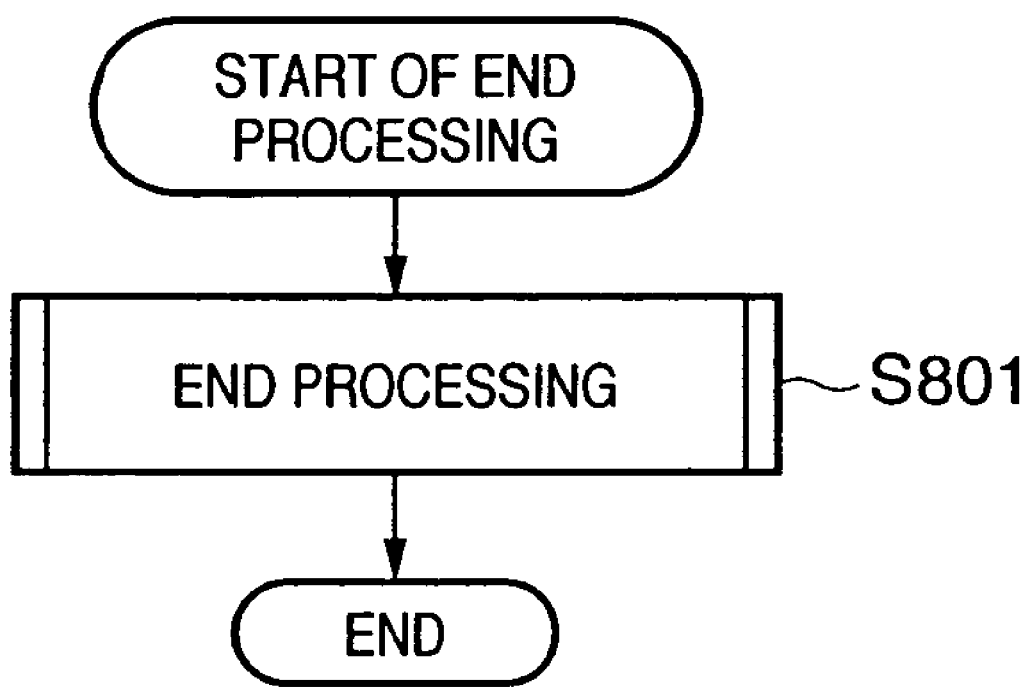
FIG. 9 is a flowchart showing an end processing according to this embodiment.

When the application 401 calls end processing of the printer driver 402 to end printing, the end processing is executed (step S801 in FIG. 9) such that the memory area reserved in the free memory area 202 is released (step S58). All the processing is complete. Printing by printing processing program from the application of this embodiment is also complete. The printing processing data and program are erased from the RAM 2 by the function of the OS 405.

In this embodiment, the medium which stores the printing processing program is an external memory. Examples of the external memory are an FD drive, HD drive, CD-ROM, and IC memory card. In addition, the ROM 3 may store the printing program of this embodiment alone or may store it together with a program running under the control of an OS or running on another host computer. This configuration is arranged to serve as part of a memory map. The printing program can be directly executed by the CPU 1.

As has been pointed out at the beginning of the description of this embodiment, the application executes printing processing via the printer driver in this embodiment as its application example. This technique can equally be applied when an application executes peripheral device control processing via the peripheral device control device driver to obtain the same effect as in this embodiment. The scope of this technique is also incorporated in the present invention. More specifically, the printer, printer driver, and graphic driver in this embodiment can be read as a peripheral device, device driver, and function implementation driver for another peripheral device, respectively. For example, when the peripheral device is a display, the device driver is a display driver. When the peripheral device is a scanner, the device driver is a scanner driver. Such an arrangement can obviously cope with any other peripheral device control.

A driver program is generally defined as a program which converts application designation into a command for controlling an external device (any other computer) other than the computer main body. The present invention is also applicable to a program which controls an external device from a computer on which an application is running regardless of driver names and so-called input/output devices as control targets. The term "peripheral device" or "device" of this specification represents a concept including all external devices viewed from a computer on which an application is running. This concept is also incorporated in the present invention.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-014263 filed on Jan. 22, 2004, which is hereby incorporated by reference herein.

What is claimed is:

1. A method of setting DevMode parameters for enabling an application to control a function extension module to a device driver, wherein the DevMode parameters are stored in a DevMode structure including a first structure for the device driver and a second structure for the function extension module, the method comprising:
  (a) a reserving step of reserving, by the application, a storage area for the DevMode structure, the reserving step comprising:
    (a-1) a first inquiring step of inquiring of the device driver, by the application, a size of the first structure;
    (a-2) an obtaining step of obtaining, by the device driver, the size of the first structure;
    (a-3) a second inquiring step of inquiring of the function extension module, by the device driver, a size of the second structure when the device driver receives an inquiry for the size of the first structure;
    (a-4) a responding step of responding to the device driver, by the function extension module, with the size of the second structure;
    (a-5) an adding step of adding the size of the first structure and the size of the second structure, by the device driver, to obtain a size of the DevMode structure, and responding to the application with the size of the DevMode structure; and
    (a-6) a reserving step of reserving, by the application, a storage area in the size of the DevMode structure, the storage area including a first storage area for the device driver and a second storage area for the function extension module;
  (b) a manipulating step of manipulating, by the application, DevMode parameters to be used by the device driver and the function extension module, wherein the manipulating step is executed in response to a call of a predetermined interface function prepared for the application, the predetermined interface function comprising an interface function opened for the application by the device driver or an operating system, the manipulating step comprising:
    (b-1) a first informing and instructing step of informing the application, by the device driver, of a position of the first storage area and identifiers specifying the DevMode parameters, and instructing the device driver to write the DevMode parameters in the first storage area reserved for the device driver by the application, when the DevMode parameters are manipulated for the device driver;
    (b-2) a second informing and instructing step of informing the function extension module, by the application, of a position of the second storage area and the identifiers specifying the DevMode parameters, and instructing the function extension module to write the DevMode parameters in the second storage area reserved for the function extension module by the application, when the DevMode parameters are manipulated for the function extension module; and
    (b-3) a setting step of setting, by the device driver or the function extension module, in response to the informing and instructing steps, the manipulated DevMode parameters in the first or second storage area based on the informed position of the first storage area or the second storage area and the informed identifiers identifying the DevMode parameters; and
  (c) an executing step of executing, by the device driver and the function extension module, a peripheral device control processing of the application using the manipulated DevMode parameters in the first storage area and the second storage area, respectively.

2. The method according to 1,
wherein the manipulating step further comprises a step of the application transferring at least positions of the first and second storage areas, identifiers for specifying DevMode parameters, and setting values of the DevMode parameters to the device driver or the function extension module.

3. The method according to claim 2, wherein in the transferring step, the application transfers at least the positions of the first and second storage areas, the identifiers for specifying the DevMode parameters, and the setting values of the DevMode parameters to the device driver or the function extension module as arguments of the predetermined interface function from the application.

4. The method according to claim 2, wherein the manipulation step further comprises a step of determining whether each of the transferred identifiers is an identifier of a DevMode parameter used by the device driver, and wherein, in the step of the application informing and instructing the function extension module, when it is determined that the transferred identifier is not the identifier of the DevMode parameter used by the device driver, the function extension module is instructed to set the setting value corresponding to the parameter as the DevMode parameter used by the function extension module.

5. The method according to claim 2, further comprising a step of sending a notification representing that parameter setting cannot be performed to the application when the transferred identifier is neither the identifiers of the DevMode parameters used by the device driver nor the identifiers of the DevMode parameters used by the function extension module.

6. The method according to claim 2, further comprising a step of releasing the reserved first and second storage areas when the peripheral device control processing is ended.

7. An apparatus for setting DevMode parameters, for enabling an application to control a function extension module, to a device driver which generates a peripheral device control command and the function extension module which extends a function of the device driver, wherein the DevMode parameters are stored in a DevMode structure including a first structure for the device driver and a second structure for the function extension module, the apparatus comprising:

(a) reserving means of the application for reserving a storage area for the DevMode structure, the reserving means comprising:
- (a-1) first inquiring means of the application for inquiring a size of the first structure to the device driver;
- (a-2) obtaining means of the device driver for obtaining the size of the first structure
- (a-3) second inquiring means of the device driver for inquiring a size of the second structure to the function extension module when the device driver receives an inquiry of the size of the first structure;
- (a-4) responding means of the function extension module for responding with the size of the second structure to the device driver;
- (a-5) adding means of the device driver for adding the size of the first structure and the size of the second structure to obtain a size of the DevMode structure, and for responding with the size of the DevMode structure to the application; and
- (a-6) reserving means of the application for reserving a storage area in the size of the DevMode structure, the storage area including a first storage area for the device driver and a second storage area for the function extension module;

(b) manipulating means of the application for manipulating DevMode parameters to be used by the device driver and the function extension module, wherein the manipulating means manipulates the DevMode parameters by calling a predetermined interface function prepared for the application, the manipulating means comprising:
- (b-1) first informing and instructing means of the application for informing the device driver of a position of the first storage area and identifiers of the DevMode parameters, and instructing the device driver to write the DevMode parameters in the first storage area reserved for the device driver by the application, when the DevMode parameters are manipulated for the device driver;
- (b-2) second informing and instructing means of the application for informing the function extension module of a position of the second storage area and identifiers of the DevMode parameters, and instructing the function extension module to write DevMode parameters in the second storage area reserved for the function extension module by the application, when the DevMode parameters are manipulated for the function extension module; and
- (b-3) setting means of the device driver or the function extension module for, in response to the instructions by the informing and instructing means, setting the informed DevMode parameters in the first or second storage area based on the position of the first storage area or the second storage area and the identifiers of the DevMode parameters; and (c) executing means of the device driver and the function extension module for executing a peripheral device control processing of the application using the manipulated DevMode parameters.

8. The apparatus according to 7, wherein the manipulating means further comprises transferring means for transferring at least positions of the first and second storage areas, identifiers for specifying DevMode parameters, and setting values of the DevMode parameters from the application to the device driver or the function extension module.

9. The apparatus according to claim 8, wherein the transferring means transfers from the application to the device driver or the function extension module, at least the positions of the first and second storage areas, the identifiers for specifying the DevMode parameters, and the setting values of the DevMode parameters as arguments of the predetermined interface function.

10. The apparatus according to claim 8, wherein the manipulating means further comprises determining means for determining whether each of the transferred identifiers is an identifier of a DevMode parameter used by the device driver, and wherein, when the determining means determines that the transferred identifier is not the identifier of the DevMode parameter used by the device driver, the means for instructing the function extension module instructs the function extension module to set the setting value corresponding to the DevMode parameter as the DevMode parameter used by the function extension module.

11. The apparatus according to claim 8, further comprising means for sending a notification representing that a parameter setting cannot be performed to the application when the transferred identifier is neither the identifiers of the DevMode parameters used by the device driver nor the identifiers of the DevMode parameters used by the function extension module.

12. The apparatus according to claim 8, further comprising means for releasing the reserved first and second storage area when the peripheral device control processing is ended.

13. A computer-readable storage medium which stores a program for causing a computer to execute a method of setting DevMode parameters, for enabling an application to control a function extension module to a device driver which generates a peripheral device control command and the function extension module which extends a function of the device driver, wherein the DevMode parameters are stored in a DevMode structure including a first structure for the device driver and a second structure for the function extension module, the program comprising:

(a) a reserving step of reserving, by the application, a storage area for the DevMode structure, the reserving step comprising:
- (a-1) a first reserving step of reserving, by the application, a size of the first structure to the device driver;
- (a-2) an obtaining step of obtaining, by the device driver, the size of the first structure;
- (a-3) a inquiring step inquiring, by the device driver, a size of the second structure to the function extension module when the device driver receives an inquiry of the size of the first structure;
- (a-4) a responding step of responding, by the function extension module, with the size of the second structure to the device driver;
- (a-5) an adding and responding step of adding, by the device driver, the size of the first structure and the size of the second structure to obtain a size of the DevMode structure, and responding with the size of the DevMode structure to the application; and
- (a-6) a second reserving step of reserving, by the application, a storage area in the size of the DevMode structure, the storage area including a first storage area for the device driver and a second storage area for the function extension module;

(b) a manipulating step of manipulating, by the application, DevMode parameters to be used by the device driver and the function extension module, wherein the manipulating step is executed in response to a call of a predetermined interface function prepared for the application, the predetermined interface function comprising an interface function opened for the application by the device driver or an operating system, the manipulating step comprising:

(b-1) a first informing and instructing step of informing the device driver, by the application, of a position of the first storage area and identifiers of the DevMode parameter, and instructing the device driver to write the DevMode parameters in the first storage area reserved for the device driver by the application, when the DevMode parameters are manipulated for the device driver;

(b-2) a second informing and instructing step of informing the function extension module, by the application, of a position of the second storage area and identifiers of the DevMode parameters, and instructing the function extension module to write the DevMode parameters in the second storage area reserved for the function extension module by the application, when the DevMode parameters are manipulated for the function extension module; and (b-3) a setting step of setting, by the device driver or the function extension module, in response to the informing and instructing steps, setting the manipulated DevMode parameters in the first or second storage area based on the informed position of the first storage area or the second storage area and the informed identifiers of the DevMode parameters; and (c) an executing step of executing, by the device driver and the function extension module, a peripheral device control processing of the application using the manipulated DevMode parameters in the first storage area and the second storage area, respectively.

14. A method of setting DevMode parameters, for enabling an application to control a function extension module to a device driver which generates a peripheral device control command and the function extension module which extends a function of the device driver, wherein the DevMode parameters are stored in a DevMode structure including a first structure for the device driver and a second structure for the function extension module, the method comprising:

(a) a reserving step of reserving, by the application, a storage area for the DevMode structure, by inquiring a size of the first structure to the device driver and a size of the second structure to the function extension module and adding the size of the first structure and the size of the second structure to get a size of the DevMode structure;

(b) a manipulating step of manipulating, by the application, the DevMode parameters to be used by the device driver and the function extension module, wherein the manipulating step is executed in response to a call of a predetermined interface function prepared for the application, by informing the device driver of a position of the first storage area and identifiers specifying the DevMode parameters and instructing the device driver to write the DevMode parameters in the first storage area reserved for the device driver by the application, and informing the function extension module of a position of the second storage area and identifiers specifying the DevMode parameters and instructing the function extension module to write DevMode parameters in the second storage area reserved for the function extension module by the application; and (c) an executing step executing, by the device driver and the function extension module, a peripheral device control processing of the application using the manipulated DevMode parameters in the first storage area and the second storage area, respectively.

15. An apparatus for setting DevMode parameters, for enabling an application to control a function extension module to a device driver which generates a peripheral device control command and the function extension module which extends a function of the device driver, wherein the DevMode parameters are stored in a DevMode structure including a first structure for the device driver and a second structure for the function extension module, the method comprising:

(a) reserving means of the application for reserving a storage area for the DevMode structure, by inquiring a size of the first structure to the device driver and a size of the second structure to the function extension module and adding the size of the first structure and the size of the second structure to get a size of the DevMode structure;

(b) manipulating means of the application for manipulating the DevMode parameters to be used by the device driver and the function extension module, wherein the manipulating means is activated in response to a call of a predetermined interface function prepared for the application, by informing the device driver of a position of the first storage area and identifiers specifying the DevMode parameters and instructing the device driver to write the DevMode parameters in the first storage area reserved for the device driver by the application, and informing the function extension module of a position of the second storage area and identifiers specifying the DevMode parameters and instructing the function extension module to write DevMode parameters in the second storage area reserved for the function extension module by the application; and (c) executing means of the device driver and the function extension module for executing a peripheral device control processing of the application using the manipulated DevMode parameters in the first storage area and the second storage area, respectively.

16. A computer readable storage medium which stores a program for causing a computer to execute a method of setting DevMode parameters, for enabling an application to control a function extension module to a device driver which generates a peripheral device control command and the function extension module which extends a function of the device driver, wherein the DevMode parameters are stored in a DevMode structure including a first structure for the device driver and a second structure for the function extension module, the program comprising:

(a) a reserving step of reserving, by the application, a storage area for the DevMode structure, by inquiring a size of the first structure to the device driver and a size of the second structure to the function extension module and adding the size of the first structure and the size of the second structure to get a size of the DevMode structure;

(b) a manipulating step of manipulating, by the application, the DevMode parameters to be used by the device driver and the function extension module, wherein the manipulating step is executed in response to a call of a predetermined interface function prepared for the application, by informing the device driver of a position of the first storage area and identifiers specifying the DevMode parameters and instructing the device driver to write the DevMode parameters in the first storage area reserved for the device driver by the application, and informing the function extension module of a position of the second storage area and identifiers specifying the DevMode parameters and instructing the function extension module to write DevMode parameters in the second storage area reserved for the function extension module by the application; and (c) an executing step of executing, by the device driver and the function extension module, a peripheral device control processing of the application using the manipulated DevMode parameters in the first storage area and the second storage area, respectively.

* * * * *